United States Patent [19]
Saitou

[11] Patent Number: 5,487,220
[45] Date of Patent: Jan. 30, 1996

[54] COAXIAL CABLE TERMINAL PROCESSING TOOL AND PROCESSING METHOD OF THE SAME

[75] Inventor: Tosiaki Saitou, Tokyo, Japan

[73] Assignee: NEC Corporation, Japan

[21] Appl. No.: 345,928

[22] Filed: Nov. 28, 1994

[30] Foreign Application Priority Data

Dec. 3, 1993 [JP] Japan .................. 5-339026

[51] Int. Cl.⁶ .................................................. H02G 1/00
[52] U.S. Cl. ............................................. 30/90.6; 81/9.44
[58] Field of Search ................................. 30/90.6, 90.7, 30/90.9; 83/947; 81/9.44, 9.4; 29/564.4

[56] References Cited

U.S. PATENT DOCUMENTS

| | | | |
|---|---|---|---|
| 3,623,384 | 11/1971 | Murphy | 30/90.6 |
| 4,179,956 | 12/1979 | Gooley | 30/90.8 X |
| 4,543,717 | 10/1985 | Luka | 30/90.6 |
| 5,077,895 | 1/1992 | Okubo et al. | 30/90.7 X |

*Primary Examiner*—Douglas D. Watts

*Attorney, Agent, or Firm*—Laff, Whitesel, Conte & Saret, Ltd.

[57] ABSTRACT

In a coaxial cable terminal processing tool, a processing tool main body has an arm member. A pair of rollers are pivotally supported by the processing tool main body and oppose each other. An L-shaped cable stopper is disposed in the processing tool main body to be movable in an axial direction of the rollers, and determines a cut position of the coaxial cable. A cable stopper holds the coaxial cable together with the rollers. A round blade is held by the arm member to be movable in a direction perpendicular to a plane defined by the rollers. A round blade is fixedly set in a radial direction of the rollers. A plate blade is held by the arm member to be movable in the direction perpendicular to the plane defined by the rollers, and in the axial direction of the rollers. A plate blade is variably set at the radial and axial directions of the rollers. An operation rod, a lever, a cam portion, and a compression spring move the round and plate blades to come close to and separate from the plane defined by the rollers. A round blade mounting block moves the plate blade in the axial direction of the rollers. A processing method of the coaxial cable terminal processing tool is also provided.

7 Claims, 2 Drawing Sheets

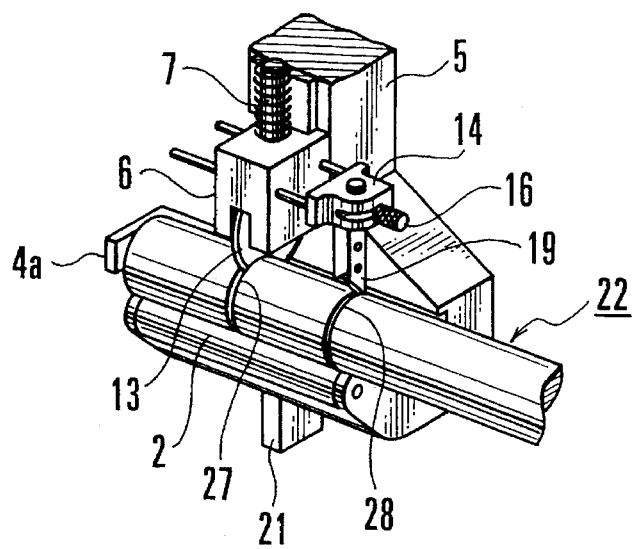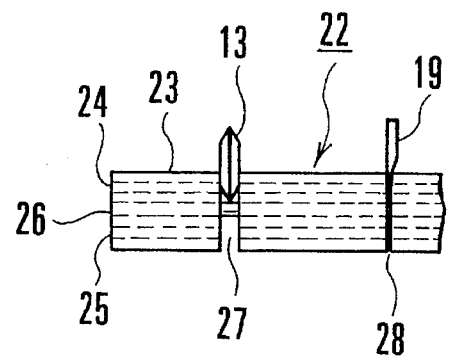
FIG. 2A  FIG. 2B
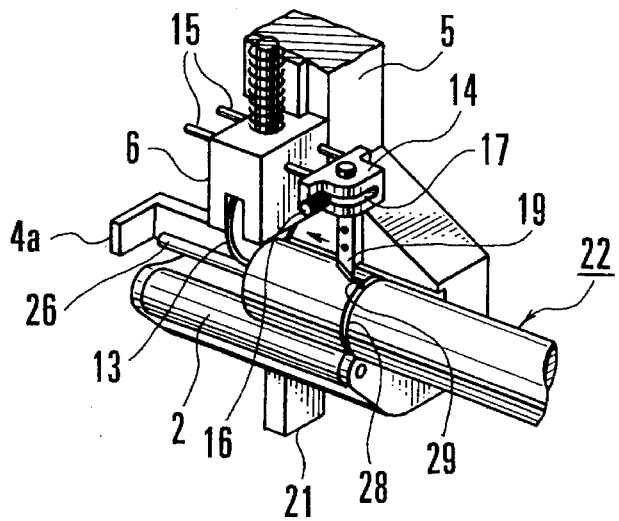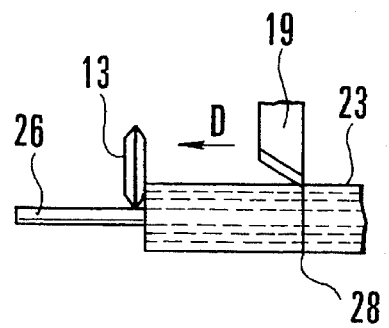
FIG. 3A  FIG. 3B
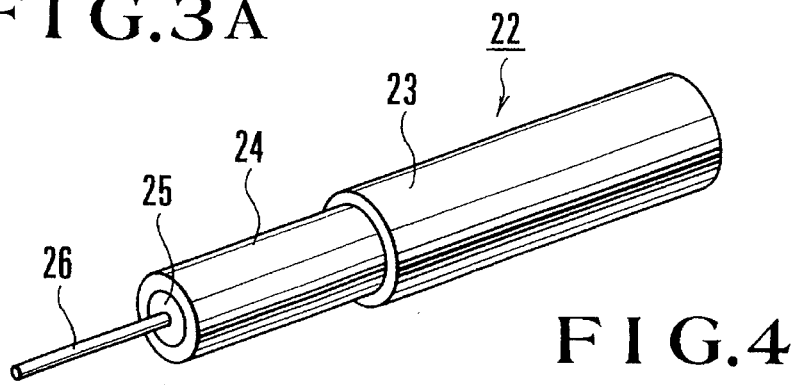
FIG. 4

COAXIAL CABLE TERMINAL PROCESSING TOOL AND PROCESSING METHOD OF THE SAME

BACKGROUND OF THE INVENTION

The present invention relates to a coaxial cable terminal processing tool for processing the terminal of a coaxial cable having an aluminum outer conductor therein, and a processing method of the same.

Generally, in processing of the terminal of, e.g., an 8C, 10C, or 12C type coaxial cable of the JIS (Japanese Industrial Standard) having an aluminum outer conductor therein, marks are formed at two to three portions, counted from the distal end of the coaxial cable, of the coaxial cable, and partial cuts are formed with a hacksaw or the like at the marks to have predetermined depths in accordance with the positions. In order to expose the aluminum outer conductor and a central conductor of the coaxial cable for predetermined lengths, a sheath, the aluminum outer conductor, and an insulator of the coaxial cable are removed by forming slits therein with a pipe cutter, a nipper, a knife, or the like in the lengthwise direction of the coaxial cable. The distal end of the exposed central conductor is chamfered with a file or the like. A gap is formed between the insulator and the outer conductor with a special tool, and the taper clamp of a connector is inserted in the gap, or a contact is inserted in the central conductor and bonded with a pressure tool. Alternatively, no gap is formed between the insulator and the outer conductor, and the taper clamp of the connector is directly inserted between the sheath and the aluminum outer conductor of the coaxial cable.

However, with the method of forming marks on the coaxial cable and thereafter forming partial cuts at the marks, the obtained results vary, and the operation requires time. Since the partial cuts and slits are formed by a manual operation, the aluminum outer conductor and the central conductor of the coaxial cable are sometimes damaged to degrade the electrical characteristics. In order not to damage the aluminum outer conductor and the central conductor, experiences and a skill are needed, and the operation is cumbersome. Furthermore, if the result of terminal processing is poor, the taper clamp cannot be easily inserted between the inner insulator and the outer conductor of the coaxial cable, so that the insulator and the outer conductor can be undesirably damaged.

SUMMARY OF THE INVENTION

It is an object of the present invention to provide a coaxial cable terminal processing tool capable of processing the terminal easily and reliably within a short period of time without requiring a skill, and a method of the same.

It is another object of the present invention to provide a coaxial cable terminal processing tool with which a taper clamp can be easily inserted in the coaxial cable after the terminal of the coaxial cable is processed, and a method of the same.

In order to achieve the above objects, according to an aspect of the present invention, there is provided a coaxial cable terminal processing tool comprising a processing tool main body having an arm member, a pair of rollers pivotally supported by the processing tool main body and opposing each other, an L-shaped cable stopper, disposed in the processing tool main body to be movable in an axial direction of the rollers, for determining a cut position of the coaxial cable, the cable stopper holding the coaxial cable together with the rollers, a first blade held by the arm member to be movable in a direction perpendicular to a plane defined by the rollers, the first blade being fixedly set in a radial direction of the rollers, a second blade held by the arm member to be movable in the direction perpendicular to the plane defined by the rollers, and in the axial direction of the rollers, the second blade being variably set at the radial and axial directions of the rollers, a first moving mechanism for moving the first and second blades to come close to and separate from the plane defined by the rollers, and a second moving mechanism for moving the second blade in the axial direction of the rollers.

BRIEF DESCRIPTION OF THE DRAWINGS

FIG. 2A is a view showing partial cut forming process performed by the coaxial cable terminal processing tool shown in FIG. 1;

FIG. 2B is a front view of the coaxial cable during the partial cut forming process shown in FIG. 2A;

FIG. 3A is a view showing split forming process performed by the coaxial cable terminal processing tool shown in FIG. 1;

FIG. 3B is a front view of the coaxial cable during the slit forming process shown in FIG. 3A; and FIG. 4 is a perspective view of the coaxial cable after terminal processing is ended.

DESCRIPTION OF THE PREFERRED EMBODIMENT

Figure 1:
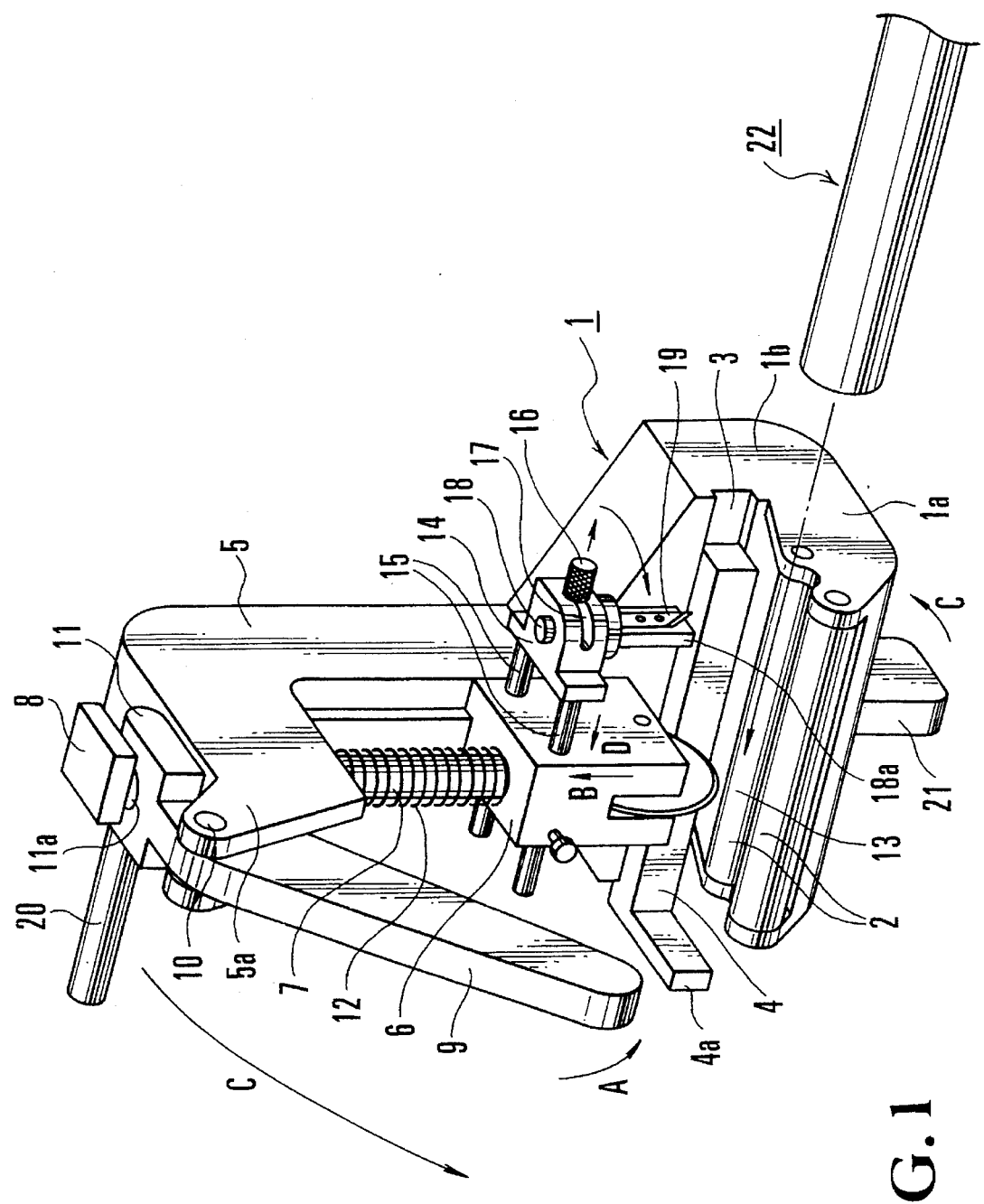
FIG. 1 is an overall perspective view of a coaxial cable terminal processing tool according to the present invention.

An embodiment of the present invention will be described with reference to the accompanying drawings. FIG. 1 shows a coaxial cable terminal processing tool according to the present invention. Referring to FIG. 1, a main body 1 of the coaxial cable terminal processing tool is constituted by a base portion 1a and an upright portion 1b formed along one side end of the base portion 1a, and has an L-shaped section. A pair of rollers 2 are provided to the base portion 1a of the main body 1 to be parallel to the upright portion 1b and to oppose each other. The two ends of each roller 2 are rotatably supported. An elongated groove 3 is formed in the inner side surface of the upright portion 1b of the main body 1 to be parallel to the rollers 2. An L-shaped cut position determining cable stopper 4 is disposed in the elongated groove 3 to be slidable with a resistance and has a bent portion 4a. An inverted L-shaped arm member 5 is integrally formed with the main body 1 on the upper end portion of the upright portion 1b and has a support portion 5a which is bent to be parallel to the base portion 1a.

A round blade mounting block 6 has a rectangular shape. An operation rod 7 extends through a hole (not shown) formed in the support portion 5a of the arm member 5 in the vertical direction and is slidably held by the support portion 5a of the arm member 5. The block 6 is fixed to the distal end of the operation rod 7 and is movable in a direction to come close to and separate from the rollers 2 of the base portion 1a. A V-shaped lever 9 is supported at the distal end of the support portion 5a to be swingable about a pin 10 as the center, and has a cam portion 11 at its one end. A hole 11a through which the operation rod 7 extends is formed in the cam portion 11. A dropout preventive portion 8 is fixed to the other end portion of the operation rod 7 extending through the hole 11a of the cam portion 11. A compression spring 12 is mounted on the operation rod 7 to bias the block 6 in a direction opposite to the direction of an arrow B, i.e., in a direction to come close to the rollers 2. When the lever 9 is pivoted in the direction of an arrow A, the cam portion 11 is engaged with the dropout preventive portion 8 to push up the operation rod 7 against the compression spring 12, so that the block 6 is moved in the direction B, i.e., in a direction to separate from the rollers 2.

A round blade 13 is pivotally supported by the round blade mounting block 6 such that its two side surfaces are sandwiched in the round blade mounting block 6. The outer circumferential portion of the round blade 13 projects from the lower end surface of the block 6 to oppose the cut position determining cable stopper 4 from above. A plate blade mounting block 14 is fixed to one end of each of two parallel shafts 15 that extend through the round blade mounting block 6 with a resistance to be parallel to the rollers 2. When the shafts 15 slidably move in the round blade mounting block 6, they can move in the axial direction of the rollers 2. A groove 17 having an open angle of 90° is formed in a side surface of the plate blade mounting block 14. A knob 16 can swing in the groove 17 within a range of the open angle of 90° between the axial and radial directions of the rollers 2. A mounting member 18 vertically extends through the plate blade mounting block 14. A plate blade 19 opposing the stopper 4 from above is mounted to a downwardly projecting exposed portion 18a of the mounting member 18. Normally, the plate blade 19 is fixed such that its direction is aligned with the rotating direction of the processing tool. After the knob 16 is pulled out to engage with the plate blade 19 in the groove 17, it is pivoted in the groove 17 through 90°. Then, the mounting member 18 is also pivoted clockwise through 90° and the plate blade 19 is fixed such that its blade is parallel to the rollers 2 while opposing the bent portion 4a of the stopper 4.

While the lever 9 has been restored by the compression spring 12 in the direction A, the advance positions of the round blade 13 and the plate blade 19 are set such that the distance between the round blade 13 and the rollers 2 and the distance between the plate blade 19 and the rollers 2 are different from each other. Thus, the round blade 13 and the plate blade 19 form partial cuts in the coaxial cable which is a multi-layer wire into different layers.

A handle 20 is mounted to the arm member 5 to manually rotate the processing tool itself about the coaxial cable as the center. A tool pullout hand grip 21 is mounted to the main body 1. The handle 20 and the tool pullout hand grip 21 are located to be separate from each other by almost 180° while sandwiching the round blade 13 between them. A coaxial cable 22 is constituted by a sheath 23, an aluminum outer conductor 24, an insulator 25, and a central conductor 26 from the outer side in this order, as shown in FIG. 4.

The sequence for processing the distal end portion of the coaxial cable with the coaxial cable terminal processing tool having the above arrangement will be described with reference to FIGS. 2A and 2B showing the partial cut forming process, and FIGS. 3A and 3B showing the split forming process. First, in accordance with cutting lines 27 and 28 shown in FIG. 2A indicating the cut positions of the coaxial cable 22, the cut position determining cable stopper 4 is slid in the elongated groove 3 to position the plate blade 19 with respect to the round blade 13, and the plate blade mounting block 14 is slid to be positioned with respect to the round blade 13. Subsequently, the lever 9 is pivoted in the direction A in FIG. 1 to move the round blade mounting block 6 in the direction B against the compression spring 12, i.e., to retract the round blade 13 and the plate blade 19 upward from the stopper 4. In this state, the coaxial cable 22 is inserted between the rollers 2 in the base portion 1a such that its distal is abutted against the bent portion 4a of the stopper 4. Then, the coaxial cable 22 is held by the stopper 4 and the rollers 2.

The lever 9 is returned in a direction opposite to the direction A, so that the round blade mounting block 6 is moved forward by the biasing force of the compression spring 12 in a direction opposite to the direction B, i.e., in a direction to come close to the rollers 2. Thus, the round blade 13 supported by the round blade mounting block 6 and the plate blade 19 enter the coaxial cable 22. At this time, as shown in FIG. 2B, the round blade 13 enters the coaxial cable 22 up to the sheath 23, the aluminum outer conductor 24, and the insulator 25, while the plate blade 19 enters the coaxial cable 22 only up to the sheath 23. In this state, the handle 20 and the tool pullout hand grip 21 are held by two hands, and the processing tool is rotated in the direction C about the coaxial cable 22 as the center. Then, the round blade 13 and the plate blade 19 pivot at the cutting lines 27 and 28 around the coaxial cable 22 to form partial cuts, thereby forming annular sectional surfaces at the cutting lines 27 and 28 of the coaxial cable 22. At this time, the coaxial cable 22 is fixed, and as the rollers 2 are rotated, the processing tool is rotated around the coaxial cable 22. Thus, at the position of the cutting line 27, the central conductor 26 is not cut, but the sheath 23, the aluminum outer conductor 24, and the insulator 25 are cut, and at the position of the cutting line 28, the aluminum outer conductor 24, the insulator 25, and the central conductor 26 are not cut, but only the sheath 23 is cut.

Thereafter, the lever 9 is pivoted in the direction A to retract the round blade 13 and the plate blade 19 from the coaxial cable 22. The coaxial cable 22 is removed from the rollers 2 and the stopper 4, and the sheath 23, the aluminum outer conductor 24, and the insulator 25 at the distal end side of the coaxial cable 22 are removed while rotating the coaxial cable 22 about the central conductor 26 as the center. Subsequently, the knob 16 is pivoted to change the direction of the plate blade 19 such that its blade is parallel to the rollers 2. The coaxial cable 22 is then inserted between the rollers 2 again, and its distal end is abutted against the bent portion 4a of the stopper 4. The lever 9 is returned in the direction opposite to the direction A, the round blade mounting block 6 is moved in the direction opposite to the direction B, and the plate blade 19 is entered only into the sheath 23 at the cutting line 28, as shown in FIG. 3A. The shafts 15 extending through the round blade mounting block 6 are slid to move the plate blade mounting block 14 mounted to the shafts 15 in a direction of an arrow D, thereby forming a slit 29 in the sheath 23 of the coaxial cable 22 to extend toward the distal end of the coaxial cable 22. Thereafter, the lever 9 is pivoted in the direction A to remove the coaxial cable 22 from the rollers 2 and the stopper 4. A portion of the sheath 23 between the cutting lines 27 and 28 is removed at the slit 29 with fingers or a tool, thereby ending the terminal processing of the coaxial cable 22 shown in FIG. 4.

As has been described above, since the coaxial cable terminal processing tool according to the present invention has the first blade for forming a partial cut and the second blade for forming both a partial cut and a slit, together with the cut position determining cable stopper, the conventional manual cutting operation by forming marks need not be performed, so that the resultant precision is improved. Terminal processing can be reliably performed within a short period of time without damaging the coaxial cable and requiring a skill. A taper clamp of the like can be easily and reliably inserted in the cable the terminal of which has been processed.

What is claimed is:

1. A coaxial cable terminal processing tool comprising:
   a processing tool main body having an arm member;
   a pair of rollers pivotally supported by said processing tool main body and opposing each other;
   an L-shaped cable stopper, disposed in said processing tool main body to be movable in an axial direction of said rollers, for determining a cut position of the coaxial cable, said cable stopper holding the coaxial cable together with said rollers;
   a first blade held by said arm member to be movable in a direction perpendicular to a plane defined by said rollers, said first blade being fixedly set in a radial direction of said rollers;
   a second blade held by said arm member to be movable in the direction perpendicular to the plane defined by said rollers, and in the axial direction of said rollers, said second blade being variably set at the radial and axial directions of said rollers;
   a first moving mechanism for moving said first and second blades to come close to and separate from the plane defined by said rollers; and
   a second moving mechanism for moving said second blade in the axial direction of said rollers.

2. A tool according to claim 1, wherein said cable stopper has a bent portion against which a distal end of the coaxial cable is abutted, said first blade is arranged between said second blade and said bent portion at predetermined distances therefrom, and said first blade is set to come closer to said rollers than said second blade.

3. A tool according to claim 1, wherein said first blade comprises a round blade, and said second blade comprises a plate blade.

4. A tool according to claim 3, further comprising a first mounting block which is moved by said first moving mechanism in a direction to come close to and separate from the plane defined by said rollers and pivotally holds said first blade, and a second mounting block which is held by said first mounting block, is moved by said second moving mechanism in the axial direction of said rollers, and holds said second blade to be pivotal in the radial and axial directions of said rollers.

5. A tool according to claim 4, wherein said second mounting block comprises a pivot mechanism for pivoting said second blade such that a direction thereof is changed from the radial direction to the axial direction of said rollers.

6. A tool according to claim 1, wherein said processing tool main body is constituted by a base portion and an upright portion formed on one side end of said base portion to have an L-shaped section, said rollers are pivotally disposed in said base portion to be parallel to said upright portion, a groove in which said cable stopper is engaged and slides is formed in an inner side surface of said upright portion, and said arm member having an inverted L shape is integrally formed on an upper portion of said upright portion, said arm member being bent to form a support portion which is parallel to said base portion and supports said first and second blades.

7. A coaxial cable terminal processing method comprising the steps of:
   positioning and holding a distal end of a coaxial cable in a longitudinal direction thereof;
   advancing first and second blades having cutting edges positioned to cut circumferentially into said cable in a direction perpendicular to the coaxial cable, said blades being sequentially arranged with a predetermined gap therebetween and at a predetermined distance from said distal end of said coaxial cable, said blades being advanced simultaneously into the coaxial cable to first and second predetermined depths, the first predetermined depth being larger than the second predetermined depth;
   pivoting said first and second blades about the axis of said coaxial cable while being advanced into the coaxial cable;
   retracting said first and second blades from the coaxial cable and pivoting said second blade to be set to cut in a lengthwise direction of the coaxial cable;
   advancing said second blade into the coaxial cable to a predetermined depth; and
   moving said second blade in the lengthwise direction of the coaxial cable while being advanced into the coaxial cable.

* * * * *